United States Patent
Reynolds et al.

(10) Patent No.: US 10,024,445 B2
(45) Date of Patent: Jul. 17, 2018

(54) REVERSE FLOW CHECK VALVE IN HYDRAULIC VALVE WITH SERIES CIRCUIT

(71) Applicant: Parker-Hannifin Corporation, Cleveland, OH (US)

(72) Inventors: Dennis Reynolds, Fort Wayne, IN (US); Brian Slattery, Hickville, OH (US); Rolf Anderson, Blaine, MN (US)

(73) Assignee: Parker-Hannifin Corporation, Cleveland, OH (US)

( * ) Notice: Subject to any disclaimer, the term of this patent is extended or adjusted under 35 U.S.C. 154(b) by 162 days.

(21) Appl. No.: 14/750,394

(22) Filed: Jun. 25, 2015

(65) Prior Publication Data

US 2015/0377370 A1   Dec. 31, 2015

Related U.S. Application Data

(60) Provisional application No. 62/016,692, filed on Jun. 25, 2014.

(51) Int. Cl.
| | | |
|---|---|---|
| *F15B 13/04* | (2006.01) | |
| *F16K 15/18* | (2006.01) | |
| *F16K 11/06* | (2006.01) | |
| *F15B 13/00* | (2006.01) | |
| *F16K 15/02* | (2006.01) | |
| *F16K 17/04* | (2006.01) | |

(52) U.S. Cl.
CPC .............. *F16K 15/18* (2013.01); *F15B 13/00* (2013.01); *F16K 11/06* (2013.01); *F16K 15/026* (2013.01); *F16K 17/04* (2013.01)

(58) Field of Classification Search
CPC .......... F16K 11/07; F16K 15/18; F15B 13/08; F15B 2211/30505; E02F 9/2267
USPC .... 137/596, 596.12, 625.34, 625.68, 625.69, 137/614
See application file for complete search history.

(56) References Cited

U.S. PATENT DOCUMENTS

| | | | | |
|---|---|---|---|---|
| 2,868,227 A | | 1/1959 | Stephens | |
| 3,216,443 A | * | 11/1965 | Schmiel | F15B 13/06 137/269 |
| 3,253,614 A | * | 5/1966 | McCay, Jr. | F15B 13/06 137/596 |
| 3,313,316 A | | 4/1967 | Thomas | |
| 3,543,644 A | * | 12/1970 | Stacey | F15B 11/17 137/596.17 |
| 3,744,518 A | * | 7/1973 | Stacey | F15B 11/165 137/271 |
| 3,759,292 A | * | 9/1973 | Bianchetta | E02F 9/2239 137/596 |

(Continued)

*Primary Examiner* — Reinaldo Sanchez-Medina
(74) *Attorney, Agent, or Firm* — Renner, Otto, Boisselle & Sklar, LLP

(57) ABSTRACT

A valve assembly includes a valve body having at least a first bore and a second bore, a flow passage connecting the first bore to the second bore, a plurality of ports opening to each bore respectively, the first bore being upstream of the second bore. First and second spools are disposed in the first and second bores, respectively, for controlling the flow of fluid to and from the respective ports. A check valve is disposed in the flow passage and configured to prevent fluid flow from the second spool towards the first spool through the flow passage while allowing fluid flow from one of the ports in the first bore towards the second spool through the flow passage.

11 Claims, 7 Drawing Sheets

(56) References Cited

U.S. PATENT DOCUMENTS

| | | | | |
|---|---|---|---|---|
| 4,099,541 | A | * | 7/1978 | Binkley ............... F15B 13/08 |
| | | | | 137/596.13 |
| 4,137,944 | A | * | 2/1979 | Koch ................. B60T 13/22 |
| | | | | 137/596 |
| 4,167,197 | A | * | 9/1979 | Maki ................. F15B 13/02 |
| | | | | 137/269 |
| 4,372,408 | A | * | 2/1983 | Chatterjea ............ B62D 11/08 |
| | | | | 137/596 |
| 5,228,289 | A | | 7/1993 | Norton |
| 5,622,206 | A | * | 4/1997 | Takeuchi ............. E02F 9/2225 |
| | | | | 137/596 |
| 6,192,928 | B1 | | 2/2001 | Knoell et al. |
| 6,505,645 | B1 | | 1/2003 | Pack et al. |
| 8,316,757 | B2 | | 11/2012 | Rinaldi |
| 2004/0154674 | A1 | | 8/2004 | Pieper |
| 2013/0125539 | A1 | | 5/2013 | Kobayashi et al. |

* cited by examiner

REVERSE FLOW CHECK VALVE IN HYDRAULIC VALVE WITH SERIES CIRCUIT

RELATED APPLICATIONS

This application claims the benefit of U.S. Provisional Application No. 62/016,692 filed Jun. 25, 2014, which is hereby incorporated herein by reference.

FIELD OF INVENTION

The present invention relates generally to valves assemblies, and more particularly to a valve assembly for controlling the flow of hydraulic fluid from a hydraulic pump to a movable member.

BACKGROUND

Hydraulic valves are connected to a pump and a tank and connected to movable members of construction and industrial equipment. Examples of these movable members are cylinders and hydraulic motors. The flow of fluid to and from each movable member is typically controlled by a control spool, which in turn is controlled manually or by hydraulic proportional pressure reducing valves, that themselves are controlled either manually or electro-hydraulically. The movement of the control spool, which resides in a bore inside the hydraulic valve assembly, opens and closes passages between the movable members and hoses or pipes that connect to a pump and a tank.

The valve assembly is a hydraulic devise that controls hydraulic fluid from a hydraulic pump to different movable members on construction and industrial equipment. Each movable member is controlled by a hydraulic section that consists of a body with a pair of work ports, and a pump inlet and tank outlet. A spool inside the body controls the flow of fluid to and from the different ports. An assembly can consist of a single section to operate a single movable member or a plurality of sections to operate a plurality of movable members. If multiple movable members are involved, one of the methods of controlling the fluid is an industry accepted hydraulic circuit identified as a series circuit. The series circuit allows the different movable member to be connected to each other by way of the valve assembly. This connection offers an advantage of recycling return flow from moving members that are activated to downstream moving members.

SUMMARY

However, the series circuit connection has a disadvantage of allowing a movable member that is located downstream in the circuit to cause motion of a movable function upstream in the circuit.

Therefore, according to one aspect of the invention, a valve assembly includes a valve body having at least a first bore and a second bore, a flow passage connecting the first bore to the second bore, a plurality of ports opening to each bore respectively, the first bore being upstream of the second bore; first and second spools disposed in the first and second bores respectively for controlling the flow of fluid to and from the respective ports; and a check valve disposed in the flow passage and configured to prevent fluid flow from the second spool towards the first spool through the flow passage while allowing fluid flow from one of the ports in the first bore towards the second spool through the flow passage.

Optionally, the valve body further includes a third bore downstream of the second bore and a second flow passage connecting the second bore to the third bore.

Optionally, the valve assembly includes a third spool disposed in the third bore and a check valve disposed in the second flow passage and configured to prevent fluid flow from the third spool towards the second spool through the second flow passage while allowing fluid flow from one of the ports in the second bore towards the third spool through the second flow passage.

Optionally, the check valve is a spring biased closed poppet/seat check or a spring biased closed moving spool.

Optionally, the valve body is monocast.

Optionally, valve body includes a bore through the flow passage for receiving the check valve.

Optionally, the check valve includes a spool biased in a closed position by a resilient member to prevent fluid flow through the flow passage and being movable by upstream pressure to an open position allowing fluid flow through the flow passage.

Optionally, the valve assembly includes a cap secured to the valve body to close the bore, wherein the spool is biased against the cap in the closed position.

According to another aspect, a method of forming the valve assembly includes machining a bore in the valve body that is larger in diameter than a width of the flow passage and perpendicular to the path of fluid flow, the bore being above and below the passage.

Optionally, the method includes inserting the check valve in the bore such that a spool of the valve resides in the bore above and below the passage thereby blocking the passage.

According to another aspect, a valve assembly includes a valve body having at least a first bore and a second bore, a downstream feed passage connecting the first bore to the second bore, and one or more ports opening to each bore respectively, the first bore being upstream of the second bore; upstream and downstream spools disposed in the first and second bores respectively; and a check valve disposed in the downstream feed passage to prevent reverse motion to an upstream function connected to the one or more ports opening to the first bore when a downstream function connected to the one or more ports opening to the second bore is activated.

Optionally, a reverse motion check valve includes a valve body, including a flow passage and a bore extending perpendicularly through the flow passage and extending above and below the passage; and a spool biased in a closed position to prevent fluid flow through the flow passage and being movable by upstream pressure to an open position allowing fluid flow through the flow passage.

Optionally, the bore is larger in diameter than an immediately adjacent and downstream portion of the flow passage.

Optionally, the valve body is monocast.

Optionally, an end of the spool opposite a spring causing the biasing is fluidly connected to pressure upstream of the spool and an end of the spool with the spring is fluidly connected to pressure downstream of the spool, and wherein, if the pressure upstream is greater than the pressure downstream, plus load generated by the spring, the spool will move toward the end having the spring and allow flow from upstream of the bore to continue downstream of the bore, and if the pressure downstream is higher than the upstream pressure minus load generated by the spring, then the spool moves in a direction opposite the spring and closes the flow passage.

The foregoing and other features of the invention are hereinafter described in greater detail with reference to the accompanying drawings.

DETAILED DESCRIPTION

A valve assembly 10 is a hydraulic device that controls hydraulic fluid from a hydraulic pump to different movable members on construction and industrial equipment. Each movable member is controlled by a hydraulic section that consists of a body with a pair of work ports, and a pump inlet and tank outlet. A spool inside the body controls the flow of fluid to and from the different ports. An assembly may consist of a single section to operate a single movable member or a plurality of sections to operate a plurality of movable members. If multiple movable members are involved, a method of controlling the fluid is by a hydraulic circuit identified as a series circuit. The series circuit allows the different movable members to be connected to each other by way of the valve assembly. This connection offers an advantage of recycling return flow from moving members that are activated to downstream moving members. The valve assembly 10 prevents a downstream function from influencing motion in an upstream function.

Figure 8:
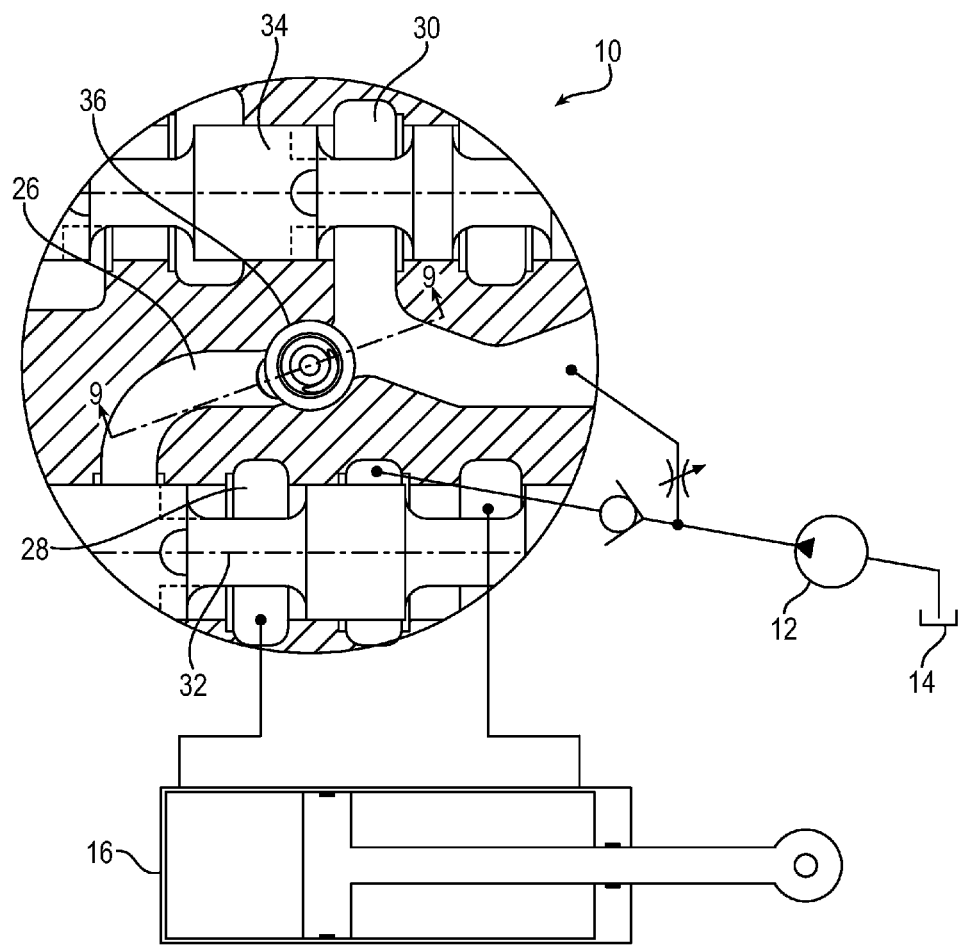
FIG. 8 is a partial cross-sectional view of the valve assembly shown connected to a pump and cylinder.
Figure 10:
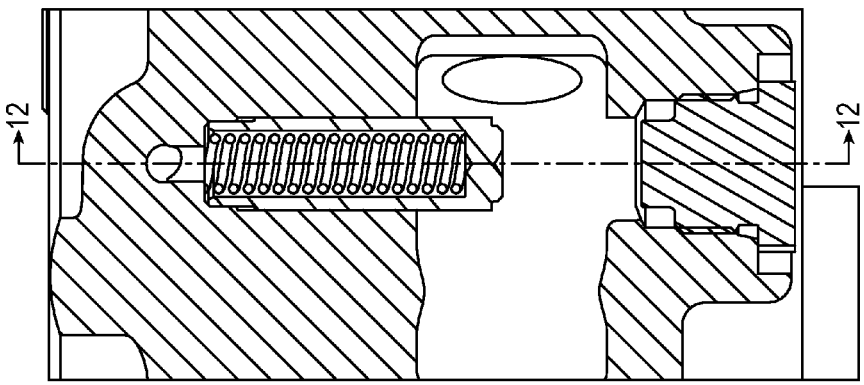
FIG. 10 is a cross-sectional view of the valve assembly taken about line A-A in FIG. 8 showing a check valve in an open position.

As shown in FIG. 8, the hydraulic valve 10 is connected to a pump 12 and a tank 14 and connected to a movable member 16, such as a cylinder or hydraulic motor of construction and industrial equipment. The flow of fluid to and from each movable member is controlled by a control spool, which in turn is controlled manually or by one or more hydraulic proportional pressure reducing valves, that themselves are controlled either manually or electro-hydraulically. The movement of the control spool, which resides in a bore inside the hydraulic valve, opens and closes passages between the movable members and hoses or pipes that connect to the pump and the tank. The description of points along any flow path of fluid has two industry conventions, upstream and downstream. Upstream is closer to the pump source and downstream is closer to the tank. The valve assembly 10 may have a housing 12 formed in any suitable manner, such as a monocast valve housing, which is one housing that incorporates an inlet port, a tank port and a pair of work ports and moving control spool for each moving member on the construction or industrial equipment. In addition to the work ports and moving control spools, there are multiple control spool actuators, flow checks and relief valves that assist with the flow and pressure management of the hydraulic circuit inside the valve.

When the functions on the equipment are not selected to be operated, the control spools allow the pump to connect to the tank. When the operator decides to activate a particular function on the equipment, the operator positions the control spool to close the connection of the pump to the tank and open a passage between the pump and a work port connected to the moveable member for that desired function. This connection provides pump flow to the movable function causing the function to move. As the function moves, it displaces fluid and that displaced fluid is redirected to the feed cavity for the downstream sections by way of the opposite work port and the control spool connecting that work port to a downstream feed passage. This return oil is being recycled to feed a downstream movable member. If no downstream spools are selected to move, the downstream feed passage is connected to the tank outlet. If another downstream spool is selected to operate another function, this downstream spool also directs fluid from the downstream feed passage to the second movable member and the displaced fluid from the second moveable member is connected to the feed passage that is downstream of the control spool that operated the second movable function. The last section downstream directs the return oil to the tank. This is a series circuit.

As described above, multiple functions are connected to each because of the displaced oil from a function is used to activate downstream functions. A disadvantage exists in prior designs when a function downstream is in operation by itself and then, an upstream function is commanded to begin operating and that upstream function is a single rod cylinder. The single rod cylinder contains two pressurized chambers. The chambers are separated with a piston. The piston has a rod connected to one end. The hydraulic areas projected onto the piston in the two chambers will be different because of the presence of the rod. The hydraulic area on the side of the piston without the rod is the area of the piston. The hydraulic area on the side of the piston with the rod is the area of the piston minus the area of the rod. As a downstream movable member is operating, it creates working pressure. This pressure is present from that downstream section all the way back to the pump.

When an upstream function is commanded to retract a cylinder, because of the series circuit, the pump flow will be diverted to the upstream cylinder's rod chamber, while the opposite piston chamber is connected to the downstream working pressure. During the redirecting the pump flow from the downstream moving member to the up stream's moving member, there is a transition point were the pump will be in communication with both the upstream and downstream moving members. During this period of shared pump communication, the working pressure of the downstream function will be introduced to both the piston side of the upstream function's cylinder and the rod side of the upstream function's cylinder. Because this pressure is equal, but the hydraulic areas are different, the cylinder will want to move toward the smallest hydraulic area, thus extending the cylinder. If the intent of operating this function was to redirect the pump flow to the rod end of the cylinder in order to retract the cylinder, because of the area differences, the cylinder will want to extant rather than retract. However, a transition check between the rod end of the cylinder and the pump will not allow flow to exit the rod end of the cylinder. Because the oil cannot escape, the pressure on the rod side of the cylinder will increase to the downstream working pressures times the ratio of the piston area divided by the piston area minus the rod area. If the rod end of the cylinder has a relief valve present and the amplified pressure in the rod end is high enough to reach the setting of the upstream rod end relief valve setting, the relief valve will unseat and allow the oil in the rod side of the cylinder to move to tank, and now with a flow path present for the rod end of the cylinder, the cylinder will extend. If this condition occurs, then the cylinder is moving a direction it was not intended to move. This condition will continue until the upstream spool has severed the communication between pump and the downstream function. In order to eliminate this condition, a reverse motion check is provided in the downstream feed passage between the upstream spool and the downstream spool. The purpose of this application is to provide a check to prevent reverse motion to an upstream function when a downstream function is activated.

Figure 1:
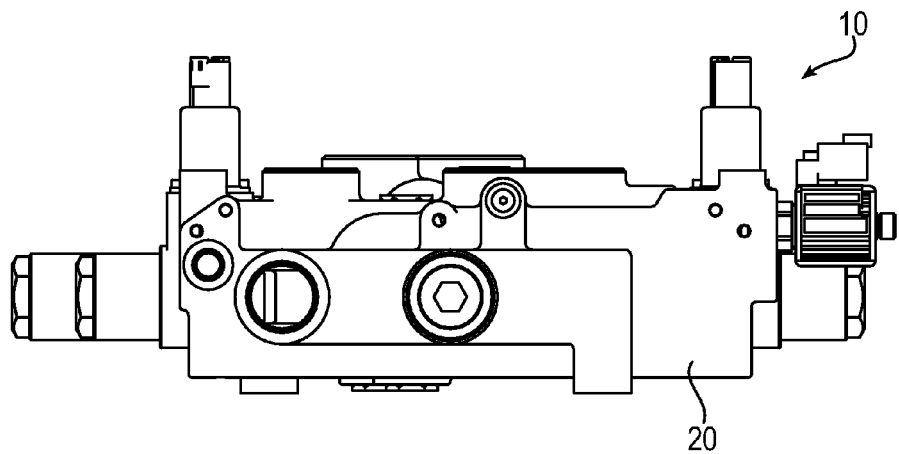
FIG. 1 is a front view of an exemplary valve assembly according to the invention.
Figure 2:
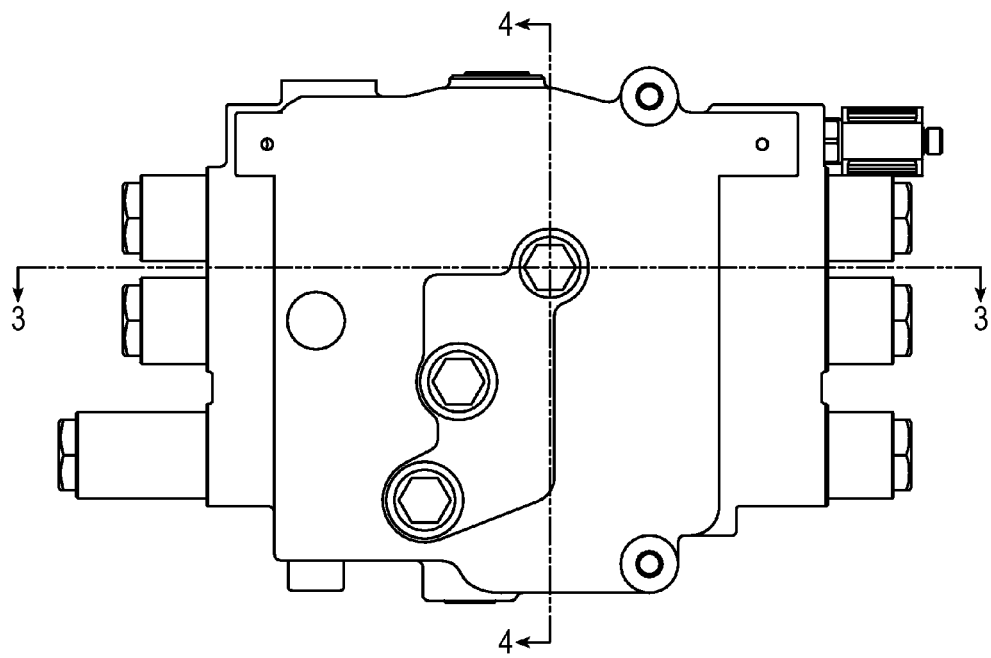
FIG. 2 is a top view of the valve assembly.
Figure 3:
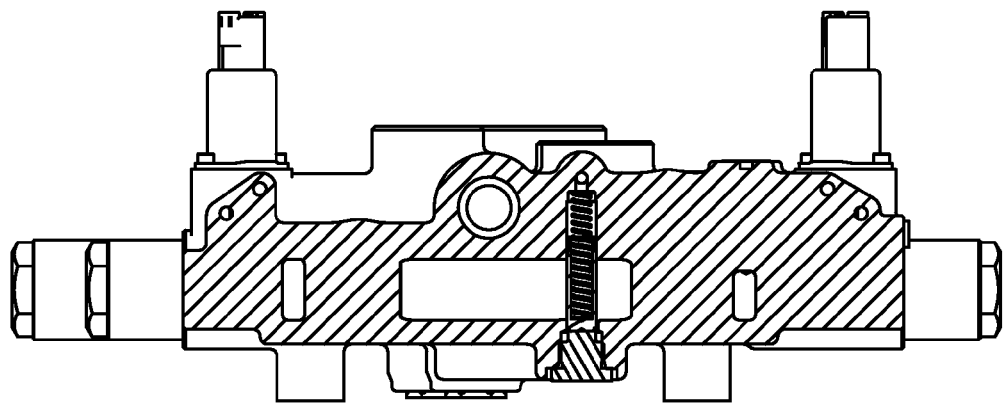
FIG. 3 is a cross-sectional view of the valve assembly taken about line A-A in FIG. 2.
Figure 4:
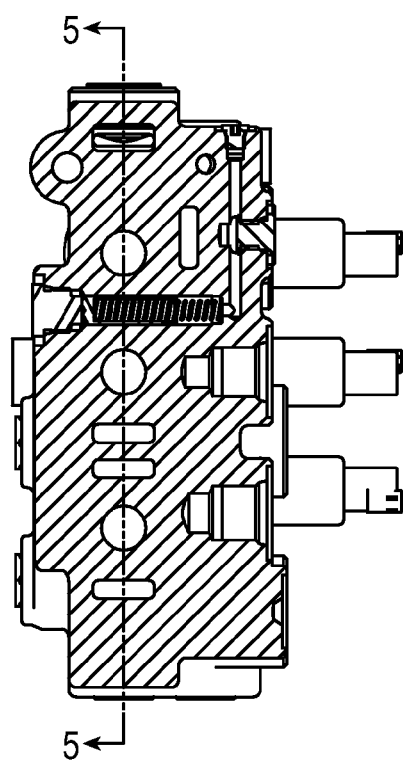
FIG. 4 is a cross-sectional view of the valve assembly taken about line B-B in FIG. 2.
Figure 5:
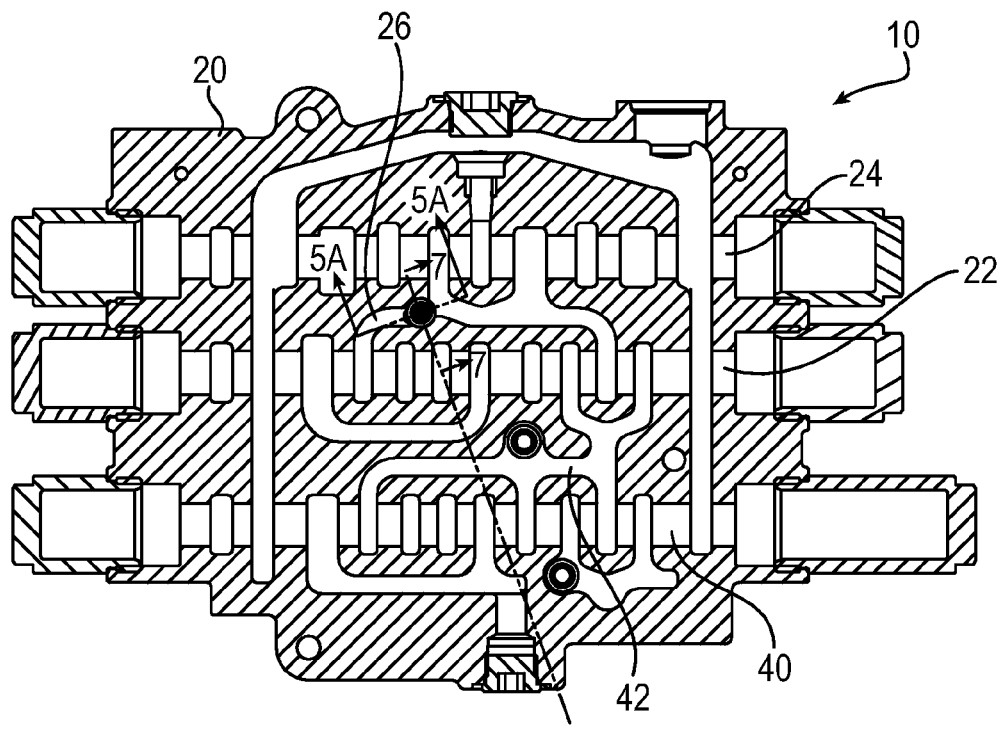
FIG. 5 is a cross-sectional view of the valve assembly taken about line C-C in FIG. 4.
Figure 5A:
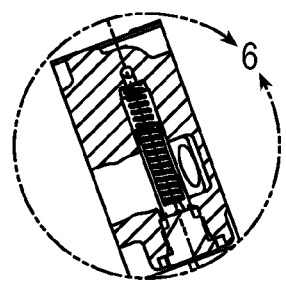
Figure 6:
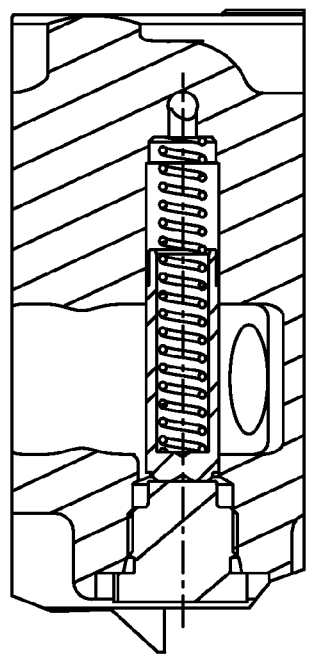
FIG. 6 is a cross-sectional view of the detail D-D in FIG. 5.
Figure 7:
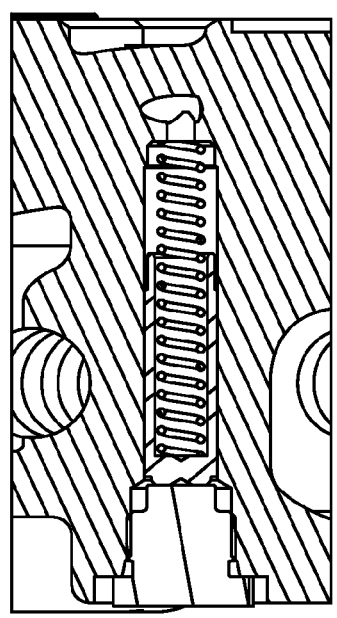
FIG. 7 is a cross-sectional view of the valve assembly taken about line E-E in FIG. 5.

Referring now to FIGS. 1-12 in detail, and particularly to FIGS. 5 and 8, the valve assembly 10 includes a valve body 20 having at least a first bore 22 and a second bore 24, a flow passage 26 connecting the first bore to the second bore, a plurality of ports 28 and 30 opening to each bore respectively, the first bore being upstream of the second bore. The assembly 10 also includes first and second spools 32 and 34 disposed in the first and second bores respectively for controlling the flow of fluid to and from the respective ports, and a check valve 36 disposed in the flow passage and configured to prevent fluid flow from the second spool towards the first spool through the flow passage while allowing fluid flow from one of the ports in the first bore towards the second spool through the flow passage. The valve assembly can further include a third bore 40 upstream of the first bore and a second flow passage 42 connecting the third bore to the first bore. A third spool is disposed in the third bore and a second check valve (not shown) disposed in the second flow passage 42 to prevent fluid flow from the first spool towards the third spool through the second flow passage while allowing fluid flow from one of the ports in the third bore towards the first spool through the second flow passage.

Figure 9:
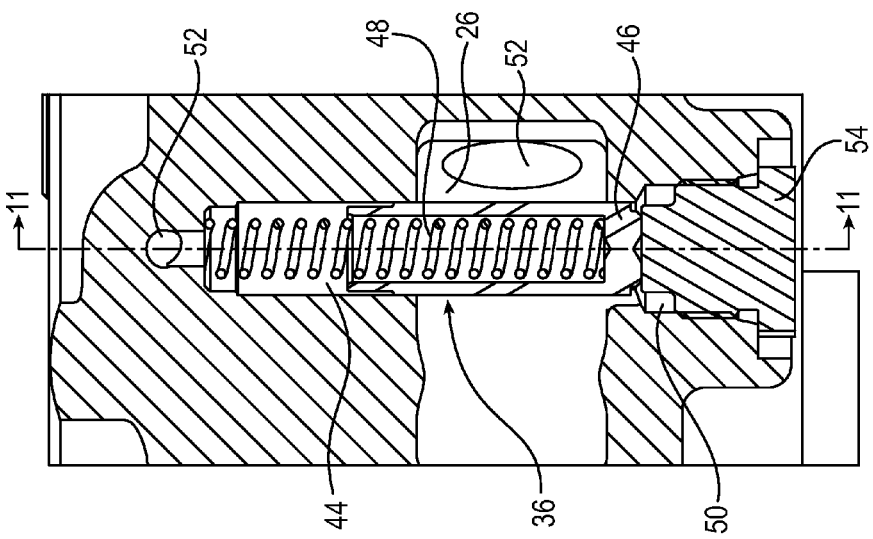
FIG. 9 is a cross-sectional view of the valve assembly taken about line A-A in FIG. 8 showing a check valve in a closed position.
Figure 12:
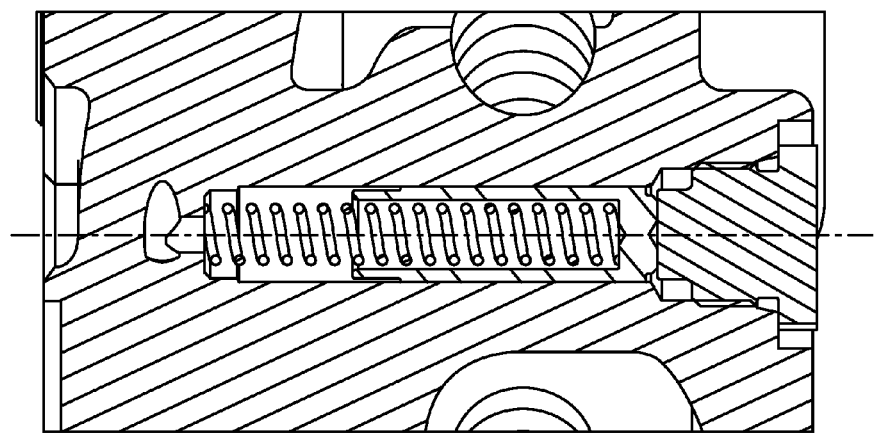
FIG. 12 is a cross-sectional view of the valve assembly taken about line B-B in FIG. 10 showing a check valve in an open position.
Figure 11:
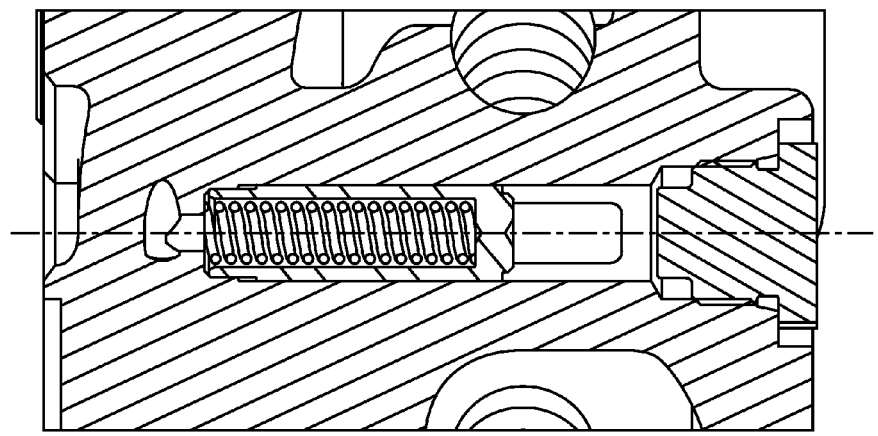
FIG. 11 is a cross-sectional view of the valve assembly taken about line B-B in FIG. 9 showing a check valve in a closed position.

Turning now to FIGS. 9-12, the check valve may be a spring biased closed poppet/seat check or a spring biased closed moving spool. The valve body may be monocast, and may include a bore 44 through the flow passage, above and below the passage, for receiving the check valve 36. The check valve may include a spool 46 biased in a closed position as shown in FIGS. 9 and 11 by a resilient member 48 to prevent fluid flow through the flow passage 26 and being movable by upstream pressure shown at 50 to an open position shown in FIGS. 10 and 12 allowing fluid flow through the flow passage. When in the closed position, downstream pressure shown at 52 cannot pass through the flow passage 26. The assembly may further include a cap 54 secured to the valve body to close the bore 44, wherein the spool is biased against the cap in the closed position.

This reverse motion check may incorporate a spring biased closed poppet/seat check, or it may use a spring biased closed moving spool residing in a passage. The placement of the reverse motion check in this application will be in the passage that allows the flow from an upstream work port to feed the downstream spools. The reverse motion check works by machining a bore that is larger in diameter than the width of the downstream feed passage and perpendicular to the path of fluid flow. This bore would also be above and below the passage. The bores above and below the passage would be fully cylindrically shaped bores. When the bores transverse the passage, because of the passage interrupting the diameter of the bore, the bore will be two opposing arcs. With the cylindrical shaped spool residing in both fully cylindrical bores above and below the passage, the passage is blocked by the interference of the spool. In this condition, the only flow path available is the spool to bore clearance that is present in the opposing arcs and in the fully cylindrical bores. If the spool is allowed to move out of one of the fully cylindrical bores, the spool will no longer be interference and the flow can pass through the passage. Controlling the movement of the spool is achieved by using a spring on one end of the spool to keep it in both cylindrical bores. The spool end opposite the spring would have access to the pressure upstream of the spool check. The spool end with the biasing spring would have access to the pressure downstream of the spool check. If the pressure upstream is greater than the pressure downstream, plus the load generated by the biasing spring, the spool check will move toward the spring end and leave the fully cylindrical core opposite the spring, allowing flow to continue downstream shown in FIGS. 10 and 12. If the pressure downstream is higher than the upstream pressure minus the load generated by the biasing spring, then the spool moves in the direction opposite the spring and engages both fully cylindrical bores and closes the flow path as shown in FIGS. 9 and 11.

By utilizing this reverse motion check in the passage that communicates the downstream pressure into the upstream piston area, the upstream moving member will not have the same downstream working pressure in both cylinder chambers because the reverse motion check will close if the downstream working pressure is higher than the pressure in the upstream piston chamber. The reverse motion check will stay closed until the upstream spool has moved past the transition point of allowing the pump to be in communication with the downstream function. The pump is now dedicated to the upstream function and, if allowed by the pressure regulators in the system, builds enough pressure in the upstream functions to be higher than in the downstream function and allow the reverse motion check to open and introduce the recycled upstream oil to be used by the downstream function.

The checks described in this application are placed in the downstream feed core that is connected to both work ports. This will protect both work ports from reverse-flow, and thus give the end user more freedom in choosing how to connect the pressurized chambers of the moving members.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A valve assembly including:
a valve body having at least a first bore and a second bore, a plurality of ports opening to each bore respectively, the first bore being upstream of the second bore;
first and second spools disposed in the first and second bores respectively for controlling the flow of fluid to and from the respective ports to selectively operate respective first and second functions;
the first spool being configured, when in an activated position, to direct fluid from one work port to the first function to move the first function and to direct fluid displaced by the first function to an opposite work port;
a flow passage connecting the opposite work port to the downstream second bore to direct fluid displaced by the first function to the second bore and create a series circuit between the first function and the downstream second function; and
a check valve disposed in the flow passage and configured to prevent fluid flow from the second spool towards the opposite work port in the first bore through the flow passage while allowing fluid flow from the opposite work port in the first bore towards the second spool through the flow passage;
wherein the first function includes a first movable member of construction or industrial equipment and wherein the second function includes a second movable member of construction or industrial equipment.

2. The valve assembly according to claim 1, wherein the valve body further includes a third bore downstream of the second bore and a second flow passage connecting the second bore to the third bore.

3. The valve assembly according to claim 2, further including a third spool disposed in the third bore and a second check valve disposed in the second flow passage and configured to prevent fluid flow from the third spool towards the second spool through the second flow passage while allowing fluid flow from one of the ports in the second bore towards the third spool through the second flow passage.

4. The valve assembly according to claim 1, wherein the valve body includes a third bore through the flow passage for receiving the check valve.

5. The valve assembly according to claim 4, wherein the check valve includes a third spool biased in a closed position by a resilient member to prevent fluid flow through the flow passage and being movable by upstream pressure to an open position allowing fluid flow through the flow passage.

6. The valve assembly according to claim 5, further including a cap secured to the valve body to close the third bore, wherein the third spool is biased against the cap in the closed position.

7. The valve assembly according to claim 1, wherein the check valve is a spring biased closed poppet/seat check or a spring biased closed moving spool.

8. The valve assembly according to claim 1, wherein the valve body is monocast.

9. A method of forming the valve assembly according to claim 1, the method including machining a third bore in the valve body that is larger in diameter than a width of the flow passage and perpendicular to the path of fluid flow, the third bore being above and below the passage.

10. The method according to claim 9, further including inserting the check valve in the third bore such that a third spool of the valve resides in the third bore above and below the passage thereby blocking the passage.

11. A valve assembly including:
a valve body having at least a first bore and a second bore, and one or more ports opening to each bore respectively, the first bore being upstream of the second bore;
upstream and downstream spools disposed in the first and second bores to selectively activate respectively a first upstream function and a second downstream function;
a downstream feed passage connecting the first bore to the second bore to direct fluid displaced by the first upstream function from one of the ports opening to the first bore to one of the ports opening to the second bore and to create a series circuit between the first upstream function and the second downstream function; and
a check valve disposed in the downstream feed passage to prevent reverse motion to the first upstream function connected to the one or more ports opening to the first bore when the second downstream function connected to the one or more ports opening to the second bore is activated;
wherein the first upstream function includes a first movable member of construction or industrial equipment and wherein the second downstream function includes a second movable member of construction or industrial equipment.

* * * * *